(12) United States Patent
Kwong et al.

(10) Patent No.: US 6,484,188 B1
(45) Date of Patent: Nov. 19, 2002

(54) OPTIMIZATION OF GARBAGE COLLECTION CODE IN THE CONTEXT OF RAW NATIVE INTERFACE FUNCTION CALLS IN THE JAVA PROGRAMMING LANGUAGE

(75) Inventors: Alice Kwong, Los Altos, CA (US); Michael Lai, Sunnyvale, CA (US); Julie Wang, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/475,441

(22) Filed: Dec. 30, 1999

(51) Int. Cl.[7] .............................................. G06F 17/30
(52) U.S. Cl. ....................................................... 707/206
(58) Field of Search ................................ 707/206, 100, 707/103 R; 717/116, 136, 148, 153, 7, 5; 714/38

(56) References Cited

U.S. PATENT DOCUMENTS 6,081,665 A * 6/2000 Nilsen et al. ................ 717/116
6,110,226 A * 8/2000 Bothner .......................... 717/7
6,253,215 B1 * 6/2001 Agesen et al. .............. 707/206
6,282,702 B1 * 8/2001 Ungar ............................ 717/5

* cited by examiner

Primary Examiner—Diane D. Mizrahi
(74) Attorney, Agent, or Firm—Kenyon & Kenyon

(57) ABSTRACT

A method of optimizing program code performance is disclosed. Applications written in the Java language can execute slowly. To speed up the execution time of a Java application certain slower executing methods within the application can be written in native code. When the slower executing methods are written in native code some of the advantages, such as automatic garbage collection, of the Java language are lost. Further, the resultant interface function calls between the Java methods and the native methods can result in inefficient code. The method optimizes programs written using both Java methods and native methods, i.e. mixed mode code, by analyzing a set of interface function calls from native methods to a Java Virtual Machine. Then selects a plurality of the interface function calls to either eliminate or move within the program code by analyzing either the bytecode and the intermediate language, or both, for either inefficient code constructs or inefficient code containing native interface function calls to perform garbage collection.

18 Claims, 3 Drawing Sheets

OPTIMIZATION OF GARBAGE COLLECTION CODE IN THE CONTEXT OF RAW NATIVE INTERFACE FUNCTION CALLS IN THE JAVA PROGRAMMING LANGUAGE

BACKGROUND OF THE INVENTION

The present invention pertains to the field of software optimization. More particularly, the present invention pertains to a method for optimizing Java software performance by optimizing code containing interface function calls to garbage collection.

Within the last five years there has arisen an ever increasing need to develop methods that allow a single computer program, written in one programming language, to run on various computer platforms or machines and/or operating systems that are either networked together or stand alone. For instance, the ability to run one program or application written in a single programming language on both an Apple® computer running a version of the Apple Operating System® and a personal computer (PC) running a version of the Microsoft® Windows® brand operating system. This "cross-platform" or "portability" need was acerbated by the commercialization of the World Wide Web and the advent of the Internet and the proliferation of Intranet networks. SUN Microsystems® released the JAVA programming language and its associated set of compilers as an answer to programmers' and users' portability needs.

The Java programming language is designed to be a machine-independent programming language. Java source code, as compared with C, C++, or FORTRAN, is compiled into a universal format, called bytecode. Bytecode is a set of instructions for a Virtual Machine (VM) instead of native instructions for a particular model of processor. Native code or native instructions are platform-dependent, i.e. tied to a particular model of processor. A Virtual Machine is software that mimics the performance of a hardware device. The Java bytecode is machine-independent code generated by the Java compiler and executed by the Java interpreter compiled at the last minute by a "just-in-time" compiler (JIT) compiler. The Java bytecode resembles machine code but is not specific to any one model of processor.

However, there exist certain situations when a programmer or a developer or a user (hereinafter programmer) may desire to have an application or program written in both Java language and some other non-Java language like C or C++. The non-Java language is compiled into native code. This situation typically arises when a programmer wants to speed up the execution time of a program or application. Writing certain methods in a non-Java language may speed up execution time because these methods are compiled ahead of time and not at run time and as such have no JIT time and allow much more aggressive optimization techniques to be applied to them at compile time. A programmer can determine the time it takes each method in a program or application to run by profiling the program using any number of software tools and packages, such as Intel's VTune™ 4.0. A programmer can use the resultant profile information to determine which methods are slow to execute and then elect to rewrite these methods in native code, such as C or C++. To compile such mixed language or mixed mode code the programmer uses a mixed mode Java compiler such as Intel's Bytecode Accelerator (described, e.g., in U.S. patent application Ser. No. 09/107,702, now U.S. Pat. No. 6,289,506 filed Jun. 30, 1998).

In a mixed mode environment calling from native code to Java code and vice versa, or from Java code to a Virtual Machine or vice versa, requires certain interface protocols so that the non-Java and Java methods or Java code and VM interact properly, which is required for a program's ultimate functionality. For instance, if a programmer is working in Microsoft® Corporation's Java environment the above interface is called the "raw native interface" (RNI). RNI acts as an interface to the Microsoft® Virtual Machine. However, writing a program in a mixed mode manner means that some of the benefits that the Java language offers the programmer such as Java garbage collection, can be lost. Garbage collection is an automatic system for allocating and freeing memory in Java. Microsoft®, as well as the developers of other Virtual Machines, has developed methods to ensure that objects garbage-collected by the VM are processed correctly. When running on the Microsoft® Virtual Machine the mixed mode compiler needs to issue RNI function calls specifically designed to keep track of these garbage-collected objects. However, these RNI function calls can severely impact program execution performances.

SUMMARY OF THE INVENTION

The present invention introduces a method of optimizing program code performance. The method of the present invention analyzes a set of interface function calls from a native method to a Java Virtual Machine. Then selects a plurality of the set of interface function calls by analyzing a bytecode and/or an intermediate language for at least one of code constructs, including invocation of a native interface function call to perform garbage collection and then either eliminating or moving such inefficient code within the program.

DETAILED DESCRIPTION OF THE INVENTION

According to one embodiment, the present invention provides a method for optimizing the performance of a program written using both Java and non-Java programming languages. In the following description, for purposes of explanation, specific nomenclature is set forth to provide a thorough understanding of the present invention. It will be apparent to one skilled in the art that these specific details are not required in order to practice the present invention. The same techniques and teachings of the present invention can easily be applied to compilers designed for any computer language.

Figure 1:
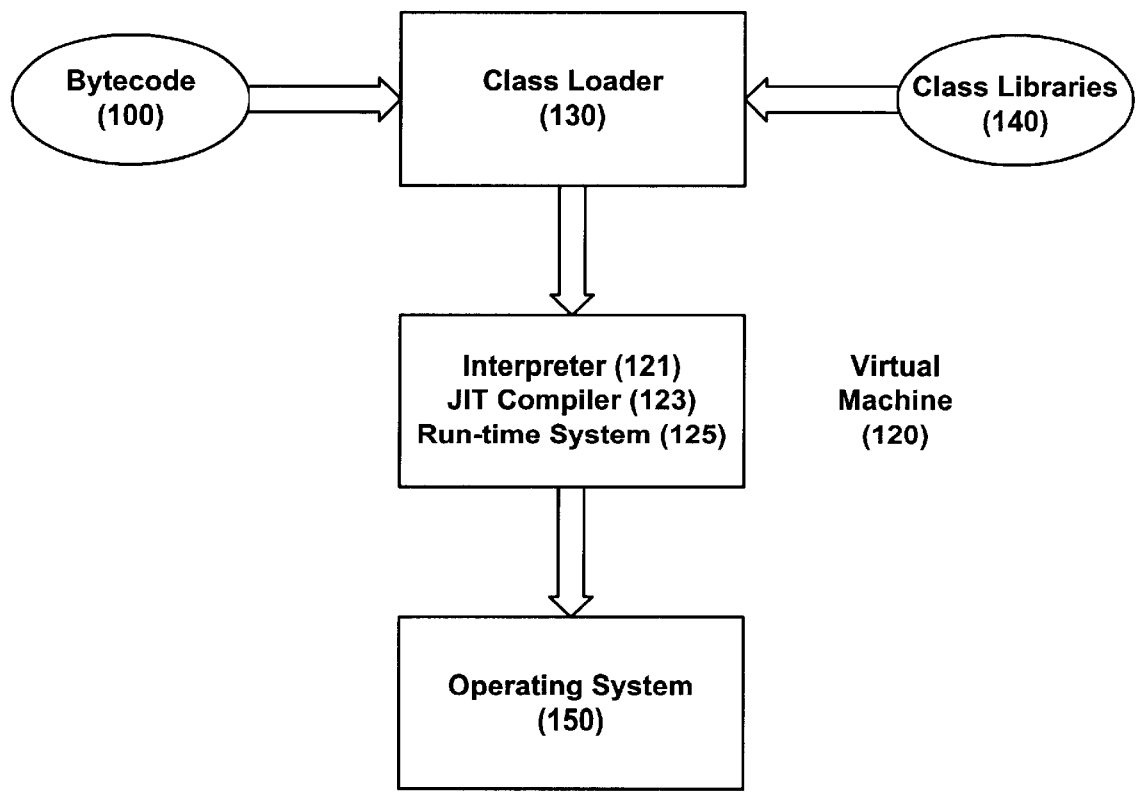
FIG. 1 is a block diagram illustrating a Java environment.

Java is a simple, object-oriented, network savvy, interpreted, robust, secure, architecture neutral, portable, multithreaded dynamic language. FIG. 1 is block diagram illustration of a Java Environment. Java language source code is compiled into bytecode 100. A Java compiler converts Java source code into a verifiably secure and compact architecture-neutral intermediate format called Java bytecode. The Java bytecode is executed by a Java Virtual Machine 120 that interprets the bytecode at run time. The Java Virtual Machine is an abstract computing machine that has its own instruction set and uses various memory areas. A Java Virtual Machine is not an actual hardware platform.

The Java interpreter 121 is relatively lightweight and small and as such it can be implemented in whatever form is desirable for a particular platform. The interpreter 121 can be run as a separate application, or it can be embedded in another piece of software, such as a Web browser. The same Java application can run on any platform that provides a Java run-time environment. Typically, a programmer writes Java language source code (.java files) and uses a Java compiler (which is itself just another computer program) to compile the source code to bytecode (.class files). These bytecodes are instructions for a Java Virtual Machine that are loaded via the class loader 130. Once the bytecodes are in the Java Virtual Machine, they are interpreted by a Java interpreter 121 or turned into native code by the "just-in-time" (JIT) compiler 123. JIT is part of the Java environment, so when the Java application is executing JIT is present. JIT knows how to interact with the Virtual Machine using some published application program interfaces (APIs).

Java has fundamental classes that contain architecture-dependent methods 140. These native methods serve as Java's gateway to the real world. Native methods allow the Java bytecode to interact with the Virtual Machine. These native methods are implemented in a native language on the host platform. The native methods provide access to resources such as, but not by way of limitation, the network, the windowing system, and the host filesystem. Additionally, but not by way of limitation, by programming through a native interface, programmers can use native methods to create, inspect and update Java objects (including arrays and strings), call Java methods, catch and throw exceptions, load classes and obtain class information and perform runtime type checking. Native methods also allow a Java application access to: needed platform dependent and/or operating system 150 features, libraries written in another language, and code written in a lower-level language such as assembler. Native methods in common usage include, but not by way of limitation, Microsoft's Raw Native Interface (RNI), Netscape's Java Runtime Interface (JRI), and Sun Microsystems' Java Native Interface (JNI).

All native interfaces are designed to allow the programmer to write Java methods in native code. How each interface accomplishes this is a little different. Microsoft's raw native interface is an interface supported by the Microsoft® VM that provides traversing between Java and native code and manipulation of objects while in native code. To use Microsoft's RNI requires the programmer to explicitly start and stop the garbage collector as appropriate. Further, the RNI interface requires the programmer to ensure that any reference to Java objects are correctly handled while garbage collection is enabled.

Some of the most important differences between Java and non-Java languages, that are compiled into native code, involve how Java manages memory. Java adds garbage collection to the language. Garbage collection is an automatic system for allocating and freeing memory in Java. The above features eliminate many otherwise insurmountable problems with safety and portability. In addition to maintaining objects in memory, the Java run-time system keeps track of all references to those objects. When an object is no longer in use, the Java run-time system automatically removes it from memory.

Garbage collection liberates programmers from the need to explicitly free allocated memory. Garbage collection is a technique to remove objects that are no longer needed. When all references to an object are gone, and the object is no longer accessible, the garbage collection mechanism reclaims it and returns the space to the available pool of resources. There are many different algorithms for garbage collection, such as, but not by way of limitation, mark and sweep or generational garbage collection.

The Java virtual machine architecture does not specify a particular garbage collection scheme. An example of one type of garbage collection algorithm is the mark and sweep system. Under this scheme, Java first walks through the tree of all accessible object references and marks them as alive. Then Java scans the heap looking for identifiable objects that are not so marked. Java finds objects on the heap because they are stored in a characteristic way and have a particular signature of bits in their handles unlikely to be reproduced naturally. The garbage collector is usually configured to run in a low priority thread. The garbage collector does most of its work during idle time while waiting for user input.

Occasionally a particular Java application may execute slowly or a programmer may desire certain performance speed-ups of a Java application. In these situations a programmer can profile a program or method using a commercially available package, like Intel's VTune™ 4.0, to see what portions of the code are running slow or otherwise inefficiently. A profiling package like VTune™ 4.0 generates information such as the length of time subroutines or methods within the program take to execute and memory usage. A programmer may find it useful to rewrite some of these routines in a non-Java language, such as C or C++, or other lower-level languages, such as assembler. The resultant Java and non-Java code is referred to as mixed mode code. (See e.g., U.S. patent application Ser. No. 09/107,702, filed Jun. 30, 1998 now U.S. Pat. No. 6,289,506)

Figure 2:
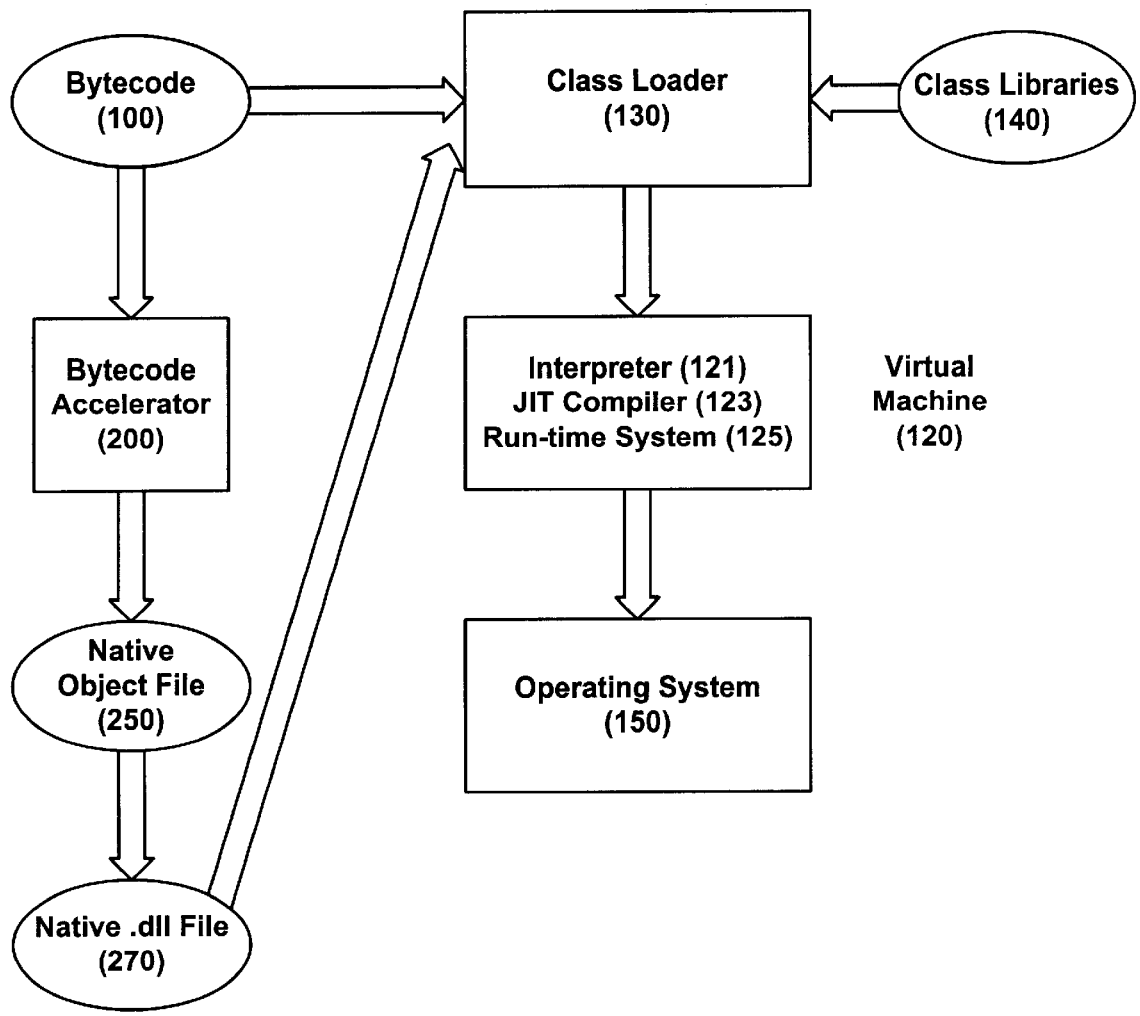
FIG. 2 is a block diagram illustrating a Java environment with a bytecode accelerator.

To compile mixed mode code a programmer can use a mixed mode compiler such as Intel's Bytecode Accelerator. FIG. 2 shows a Java environment with a bytecode accelerator. However, by writing code in a mixed mode manner the programmer may lose some of the advantages offered by programs written in straight Java language. Additionally, if the programmer writes the slower performing methods in native code the programming task becomes significantly more complex. To write Java methods in a non-Java language the programmer must understand all the native interface APIs and the process of integrating native methods into the Java program, which complicates the programming task significantly. To solve this problem a programmer may instead elect to run a software package like VTune™ Performance Analyzer that profiles a Java application as well as rewrites inefficient Java methods into native methods. VTune™ finds the methods that are taking the longest time for execution. The programmer can select these methods to be converted to native code. These selected methods then need to be precompiled ahead of time before the Java application starts to execute. It is at this point that the mixed mode compiler 200 is used. The mixed mode compiler, which sits on top of an existing Java environment, compiles these inefficient methods from the bytecode into a machine specific object code 250 such as Intel's object code. These native methods are subsequently linked into a dynamic linked library (DLL) 270. When the mixed mode program starts to execute there will be a call, which the native compiler inserts in the Java code, to load 130 the DLL into the Java environment.

If a programmer elects to write certain methods in a non-Java language he cannot rely solely on the automatic garbage collection of the Virtual Machine. By default, when executing native code on the VM garbage collection is turned off. Other threads that try to do any garbage collection will block until the thread in native code returns to Java. This allows the virtual machine to avoid conservative scanning of native stacks, which is often unreliable and can slow down performance. Generally, changing the default setting for garbage collection is not a problem because most native code calls just do quick calculations and then return. However, if native code performs an operation that takes a lot of time the programmer must explicitly enable garbage collection around the slow code. But once enabled the programmer must remember to also disable garbage collection.

However, if the programmer uses a package like Bytecode Accelerator in VTune™ Performance Analyzer to convert Java methods to native methods all the needed interface calls, such as garbage collection function calls are inserted automatically. The present invention optimizes these interface calls and generates the best code sequence for the benefit of program execution.

Microsoft's raw native interface (RNI) is a set of functions and structures, defined in native.h and nativecom.h, that allow Java to be integrated with Windows®. RNI provides an efficient way of both traversing between Java and native code, and manipulating objects while in native code. However, using RNI requires knowledge of garbage collection, pointer locking, and other issues. Further, dynamic-link libraries (DLLS) calls through RNI need to be specially written to work with RNI. However, RNI calls cannot be used to call arbitrary DLLs, although it is possible to write wrapper DLLs. To work with RNI, native code must follow naming conventions, adapt to Java data representations, and deal with the garbage collection process of the Java environment.

For example, when using Microsoft's RNI calls, if the native code is in a long loop, the garbage collector should be called periodically. Similarly, if the code is going to block user input or call a thread that will block, it should call the garbage collector around the code that can block. Furthermore, objects need to be protected by garbage collection frames when calling back into Java because enabling garbage collection when native code is executing means that any object can be moved at any time, invalidating any pointers to those objects in the native code. The simplest way to handle this is to inform the garbage collector of objects of interest before enabling garbage collection using a GCFrame with GCFramePush. Object pointers kept in the GCFrame will be automatically updated if the object gets moved. If garbage collection is enabled during execution of the native code portion, to insure that objects garbage-collected by the VM are processed correctly, the compiler issues RNI function calls specifically designed to keep track of these garbage-collected objects. These function calls usually take the following forms:

handle=GCNewHandle(object)
OR
GCSetObjectReferenceForHandle(handle, object)

The call to GCNewHandle is made to create a new handle pointing to an object. The function GCSetObjectReference-ForHandle acts to update an existing handle pointing to an object. Something both function calls are required because the compiler may not have knowledge of whether the handle already exists or not. If both function calls are required, an if-else construct taking the following pseudo code form is used.

if (handle already exists)
    GCSetObjectReferenceForHandle(handle, object)
else
    handle=GCNewHandle(object)

The above function calls, along with the if/then/else tests, initializing the temporary variables, releasing the handle at the end of the method, and branches can severely impact program execution performance. The present invention provides a method to solve these performance problems by optimizing away certain garbage collection native interface function calls.

Figure 3:
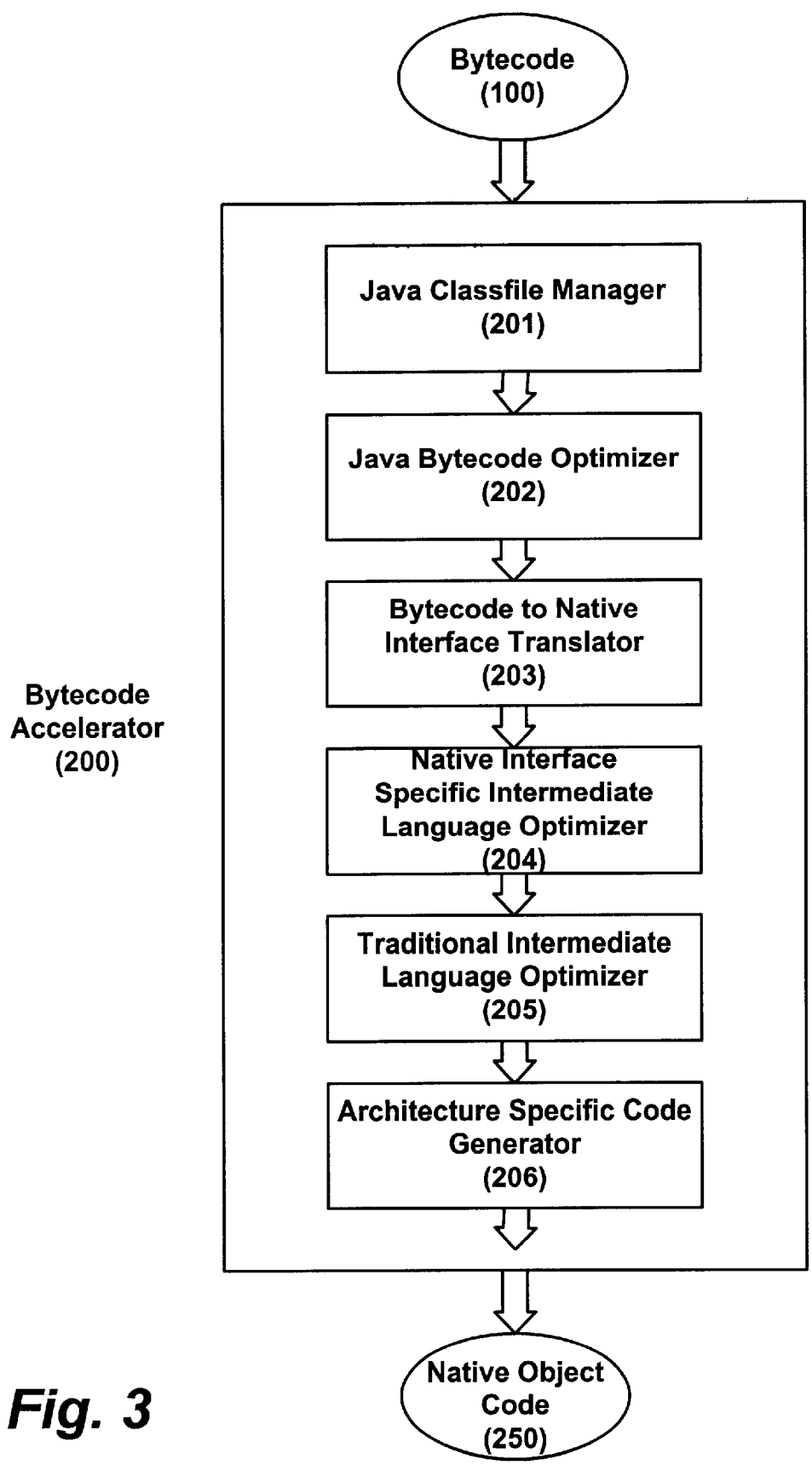
FIG. 3 is a block diagram illustrating a mixed-mode Java compiler.

The present invention eliminates needless garbage collection operations, by eliminating unnecessary structures such as if/then/else calls, initializing the temporary variables, releasing the handle at the end of a method, branches, removing handles and objects associated with unused or degenerate code by deallocating garbage collection associated with such objects. According to one embodiment of the present invention, the present method can be implemented in a compiler such as Bytecode Accelerator. FIG. 3 is a block diagram of a bytecode accelerator compiler architecture.

In one embodiment of the present invention, the input to the compiler is the Java class file. The first phase of the mixed mode compiler is the "Java Classfile Manager" 201 which reads in class file information and sets everything up for the next phase, such as the bytecode image, the constant pool information, and the interfaces to be used by the later phases to access various information stored in the class file. The code at the end of this phase is now a stream of bytecode that is subsequently fed to the "Java Bytecode Optimizer" 202.

The "Java Bytecode Optimizer" 202 performs an analysis on the bytecode 100, however it does not actually change the bytecode 100 at this time. The "Java Bytecode Optimizer" 202 analyzes the bytecode, it understands the bytecode, it generates the control flow structure, it discovers where loops are located, and it determines if the method will trigger garbage collection RNI calls. According to one embodiment of the present invention, the "Java Bytecode Optimizer" 202 analysis can be, but not by way of limitation, implemented as illustrated by the following pseudo code.

Perform control flow analysis on the byte code.
Mark each byte code if it is within a loop.
Detect if there are method calls or other native interface functions calls into the Java VM.
    If no such calls exist to trigger GC
        Mark this method "noGC required"
    Endif After this analysis is conducted the bytecode is then passed to the "Bytecode to Native Interface Translator" 203.

The "Bytecode to Native Interface Translator" 203 analyzes the bytecode stream for any interface calls (any calls into the Virtual Machine by native code activates garbage collection). In this phase the bytecode is analyzed for any calls into the Virtual Machine. If there are any interface calls back into the VM they are marked. Additionally, it is in this phase that the information generated in the "Java Bytecode Optimizer" 202 phase, such as whether bytecode appears within a loop or not, is used. In the "Bytecode to Native Interface Translator" 203, for each byte code that manipulates a garbage-collectible object the following operation, but not by way of limitation, is performed as illustrated by the below pseudo code.

The "Bytecode to Native Interface Translator" 203 also translates the bytecode stream into an intermediate language, which is then passed to the "Native Interface Specific Intermediate Language (IL) Optimizer" 204.

The input to the "Native Interface Specific IL Optimizer" 204 is not bytecode, but instead an intermediate language common to all high level languages. The code in this phase contains a lot of interface calls. These interface calls are necessary in order for the static mixed mode bytecode compiler to work at runtime. An analysis is conducted on the control flow structure and the data flow structure. The "Native Interface Specific IL Optimizer" 204 also analyzes interface calls and determines what can be done to eliminate them or move them out of loops without changing the execution of the program. For example, according to one embodiment of the present invention, if the "Native Interface Specific IL Optimizer" 204 finds an if-else statement it will look to see how the if-else statement can be eliminated or compacted. Also in this phase the optimizer evaluates the remaining garbage collection RNI function calls and creates an internal list of object-handle pairings. These pairings are used to perform loop invariant code motion (an expression that does not change inside a loop can be moved outside the loop), function call caching/memoization (subsequent function calls that always return the same result can be eliminated and replace with the result), memoization caching (an input argument that always returns the same deterministic results can be eliminated by caching the result in memory) copy/expression/propagation (replacing assignment statements when the same expressions are being used through out the code), and dead code elimination (removal of code that will not be executed at run-time). The following pseudo code illustrates, but not by way of limitation, how the internal list of object-handle pairing is executed.

```
While performing optimization
    For each variable V that is dereferenced
        If V is in the list of GC-pairings
            Alias (*V) with V's associated object
        Endif
    Endfor
    For each object variable OBJ
        If OBJ is in the list of GC-pairings
            Alias OBJ with the dereference of OBJ's associated handle
        Endif
    Endfor
Endwhile
```

The IL code is then passed to a generic optimization common to C and C++.

The generic or "Traditional IL Optimizer" 205 performs optimizations common to native languages, such machine specific optimizations. The resultant code is then passed to the Architecture Specific Code Generator 206 where the IL code is transformed into architecture native code 250. The architecture native code is the executable for the Java application.

Although several embodiments are specifically illustrated and described herein, it will be appreciated that modifications and variations of the present invention are covered by the above teachings and within the purview of the appended claims without departing from the spirit and intended scope of the invention. For example, according to one embodiment of the present invention, the "Java Bytecode Optimizer" 202 is used to analyze the bytecode to determine if a bytecode is within a loop, and to mark certain Java methods "noGC required." It is apparent to one skilled in the art that this procedure can be postponed by performing it in a later stage such as in the "Traditional IL Optimizer" 205 stage. Similarly, the procedure carried out in the "Bytecode to Native Interface Translator" 203, of paring the garbage-collectible object with a handle, could be deferred to a later phase such as the "Traditional IL Optimizer" 205 phase.

What is claimed is:

1. A method of optimizing program code performance comprising:
   (a) analyzing a set of interface function calls from a native method to a Java Virtual Machine;
   (b) selecting a plurality of the set of interface function calls by,
      (i) analyzing at least one of a bytecode and an intermediate language for at least one of code constructs, including invocation of a native interface function call to perform garbage collection;
   (c) and at least one of eliminating and moving the code constructs within program code.

2. The method of claim 1 wherein said program code comprises code written in both Java and non-Java language.

3. The method of claim 1 wherein said native interface function calls are raw native interface function calls.

4. The method of claim 1 wherein said native interface function calls are garbage collection calls.

5. The method of claim 1 wherein said analysis of the bytecode and the intermediate language further comprises at least one of
   locating loop structures within the program,
   locating interface calls, and
   locating if/then/else statements.

6. The method of claim 1 wherein a program is optimized by at least one of eliminating or moving at least one of
   interface function calls,
   if/then/else statements, and
   loop invariant code.

7. A digital processing system having a processor operable to perform the steps of:
   (a) analyzing a set of interface function calls from a native method to a Java Virtual Machine;
   (b) selecting a plurality of the set of interface function calls by,
      (i) analyzing at least one of a bytecode and an intermediate language for at least one of code constructs, including invocation of a native interface function call to perform garbage collection;
   (c) and at least one of eliminating and moving the code constructs within program code.

8. A digital processing system as in claim 7 wherein said program code comprises code written in both Java and non-Java language.

9. A digital processing system as in claim 7 wherein said native interface function calls are raw native interface function calls.

10. A digital processing system as in claim 7 wherein said native interface function calls are garbage collection calls.

11. A digital processing system as in claim 7 wherein said analysis of the bytecode and the intermediate language further comprises at least one of
    locating loop structures within the program,
    locating interface calls, and
    locating if/then/else statements.

12. A digital processing system as in claim 7 wherein said program is optimized by at least one of eliminating or moving at least one of
    interface function calls from loops,
    if/then/else statements, and
    loop invariant code.

13. A computer readable medium embodied thereon a computer program, the computer program being executable by a machine to perform:

(a) analyzing a set of interface function calls from a native method to a Java Virtual Machine;

(b) selecting a plurality of the set of interface function calls by, (i) analyzing at least one of a bytecode and an intermediate language for at least one of code constructs, including invocation of any native interface function calls to perform garbage collection;

(c) and at least one of eliminating and moving the code constructs within program code.

14. The computer readable medium having embodied thereon a computer program as claimed in claim 13 wherein said program code comprises code written in both Java and non-Java language.

15. The computer readable medium having embodied thereon a computer program as claimed in claim 13 wherein said native interface function calls are raw native interface function calls.

16. The computer readable medium having embodied thereon a computer program as claimed in claim 13 wherein said native interface function calls are garbage collection function calls.

17. The computer readable medium having embodied thereon a computer program as claimed in claim 13 wherein said analysis of the bytecode and the intermediate language further comprises at least one of locating loop structures within the program,
   locating interface calls, and
   locating if/then/else statements.

18. The computer readable medium having embodied thereon a computer program as claimed in claim 13 wherein said program is optimized by at least one of eliminating or moving at least one of interface function calls,
   if/then/else statements, and
   loop invariant code.

\* \* \* \* \*